United States Patent
Azuma (10) Patent No.: US 8,577,180 B2
(45) Date of Patent: Nov. 5, 2013

(54) IMAGE PROCESSING APPARATUS, IMAGE PROCESSING SYSTEM AND METHOD FOR PROCESSING IMAGE

(75) Inventor: Keisuke Azuma, Ichikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 266 days.

(21) Appl. No.: 13/050,793

(22) Filed: Mar. 17, 2011

(65) Prior Publication Data
US 2012/0128253 A1 May 24, 2012

(30) Foreign Application Priority Data

Nov. 22, 2010 (JP) ................................. 2010-259917

(51) Int. Cl.
*G06K 9/32* (2006.01)
(52) U.S. Cl.
USPC ...... 382/298; 345/600; 375/240.27; 283/100; 283/147; 283/261; 283/300
(58) Field of Classification Search
None
See application file for complete search history.

(56) References Cited

U.S. PATENT DOCUMENTS

| | | | | |
|---|---|---|---|---|
| 5,600,734 | A * | 2/1997 | Okubo et al. | 382/147 |
| 6,108,455 | A * | 8/2000 | Mancuso | 382/261 |
| 6,157,749 | A * | 12/2000 | Miyake | 382/300 |
| 6,859,499 | B2 * | 2/2005 | Hashimoto | 375/240.27 |
| 2005/0008192 | A1 * | 1/2005 | Kondo et al. | 382/100 |
| 2006/0290950 | A1 | 12/2006 | Platt et al. | |
| 2009/0175560 | A1 | 7/2009 | Lukac | |
| 2010/0321400 | A1 * | 12/2010 | Miyahara | 345/600 |

* cited by examiner

*Primary Examiner* — Tsung-Yin Tsai
(74) *Attorney, Agent, or Firm* — Knobbe Martens Olson & Bear LLP (57) ABSTRACT

According to one embodiment, an image processing apparatus includes an image block generator, a pixel extractor, a correction parameter calculator and a corrector. The image block generator enlarges an image block including a plurality of pixels to generate an enlarged image block. The pixel extractor extracts a maximum pixel with a maximum pixel value and a minimum pixel with a minimum pixel value from the image block. The correction parameter calculator calculates a correction parameter including a first difference and a second difference. The first difference is an absolute value of a difference between a sample pixel value of a sample pixel to be corrected in the enlarged image block and the maximum pixel value. The second difference is an absolute value of a difference between the sample pixel value and the minimum pixel value. The corrector corrects the enlarged image block using the correction parameter.

18 Claims, 13 Drawing Sheets

IMAGE PROCESSING APPARATUS, IMAGE PROCESSING SYSTEM AND METHOD FOR PROCESSING IMAGE

CROSS REFERENCE TO RELATED APPLICATIONS

This application is based upon and claims the benefit of priority from the prior Japanese Patent Application No. 2010-259917, filed on Nov. 22, 2010, the entire contents of which are incorporated herein by reference.

FIELD

The present invention relates to an image processing apparatus, an image processing system and a method for processing image.

BACKGROUND

Ordinarily, when an image is enlarged, the enlarged image blurs because the area of the image increases. In order to improve quality of the enlarged image, methods (e.g., an un-sharp masking process and a sharpening tap filter process) in which the outline of the enlarged image is enhanced to sharpen the enlarged image are known.

However, the degree of sharpening process is increased when sharpening the enlarged image. Therefore, the consumption of a memory is also increased while the sharpening process. Additionally, noise such as overshoot and undershoot may arise in proportion to the degree of sharpness in the sharpening process. As a result, noise increases with the degree of sharpness.

DETAILED DESCRIPTION

In general, according to on embodiment, an image processing apparatus includes an image block generator, a pixel extractor, a correction parameter calculator and a corrector. The image block generator enlarges an image block comprising a plurality of pixels to generate an enlarged image block. The pixel extractor extracts a maximum pixel with a maximum pixel value and a minimum pixel with a minimum pixel value from the image block. The correction parameter calculator calculates a correction parameter including a first difference and a second difference. The first difference is an absolute value of a difference between a sample pixel value of a sample pixel to be corrected in the enlarged image block and the maximum pixel value. The second difference is an absolute value of a difference between the sample pixel value and the minimum pixel value. The corrector corrects the enlarged image block using the correction parameter.

Figure 1:
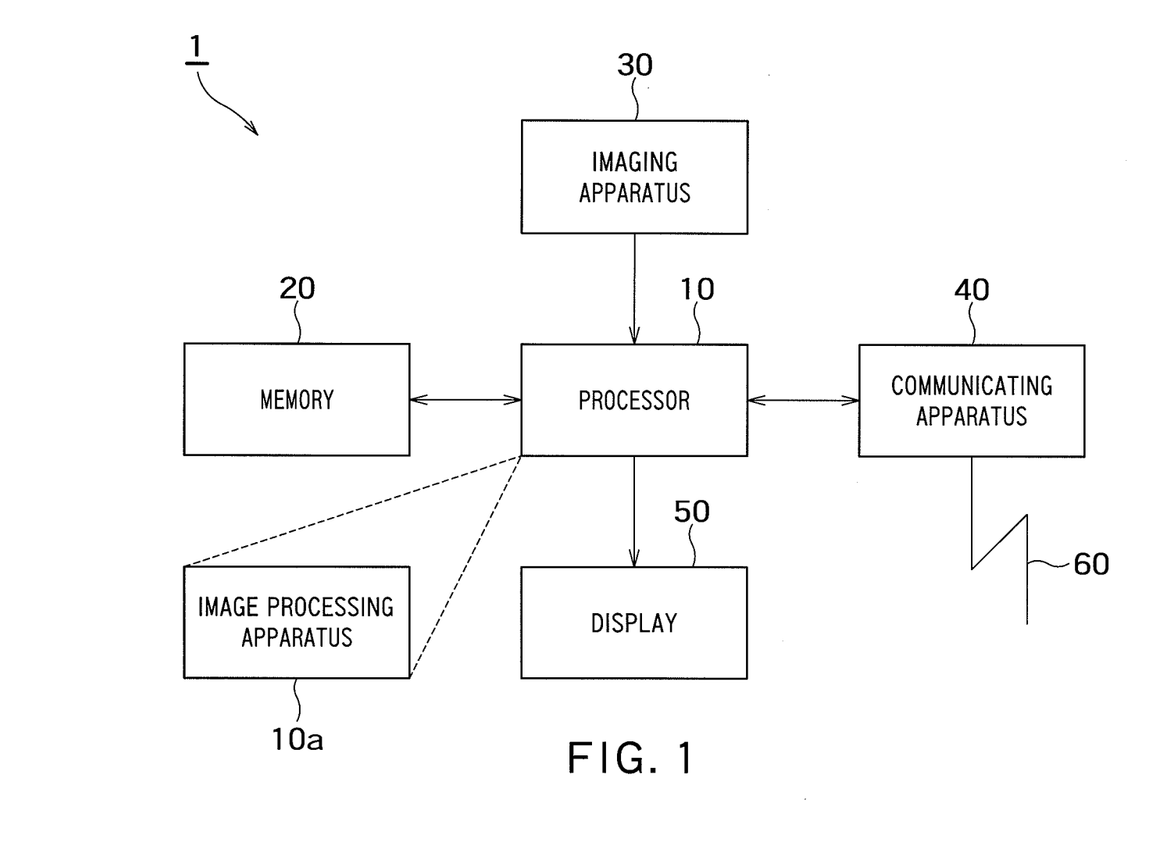
FIG. 1 is a block diagram of the configuration of an image processing system 1 of the embodiments.
Figure 2:
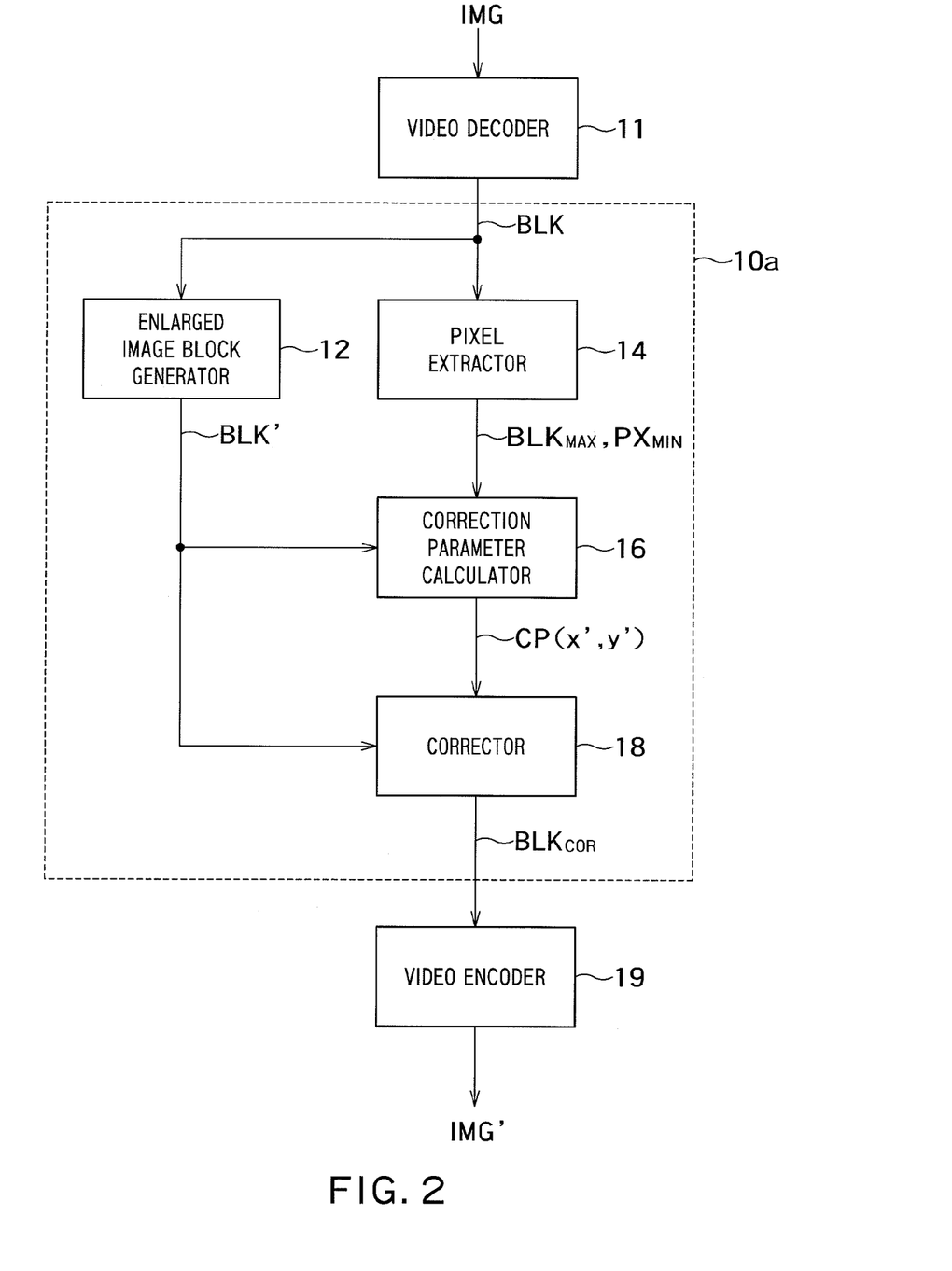
FIG. 2 is a block diagram of the configuration of an image processing apparatus 10a of the embodiments.

Embodiments will now be explained with reference to the accompanying drawings. FIG. 1 is a block diagram of the configuration of an image processing system 1 of the embodiments. FIG. 2 is a block diagram of the configuration of an image processing apparatus 10a of the embodiments.

The image processing system 1 processes image data and displays an image corresponding to the image data. The image processing system 1 includes a processor 10, a memory 20, and a display 50. The image processing system 1 is implemented in a mobile terminal such as a mobile phone. The processor 10 is connected to the memory 20 and the display 50. Further, the image processing system 1 includes, for example, an imaging apparatus 30 and a communicating apparatus 40 as an inputting device that inputs the image data. The communicating apparatus 40 is connected to a network 60 such as a wired network or a wireless network.

The processor 10 is a semiconductor integrated circuit that executes an image processing program stored in the memory 20 to realize the image processing apparatus 10a. For example, the processor 10 may be a Central Processing Unit (CPU). For example, the image processing apparatus 10a enlarges the image. The memory 20 is a semiconductor memory device such as a flash memory which can store image processing programs and various pieces of data including image data including a plurality of pixels. The memory 20 can be read by a computer. The imaging apparatus 30 picks up the image of an object to generate the image data. For example, the imaging apparatus 30 may be a digital camera. The communicating apparatus 40 transfers and receives various pieces of data via the network 60. For example, the communicating apparatus 40 may be a network interface for the network 60 such as a mobile phone network. The display 50 displays the image corresponding to image data corrected by the processor 10. For example, the display 50 may be a Liquid Crystal Display (LCD).

The image processing apparatus 10a includes an enlarged image block generator 12, a pixel extractor 14, a correction parameter calculator 16, and a corrector 18. The image processing apparatus 10a applies a predetermined enlarging process to an image block BLK generated by a video decoder 11 and supplies the image block BLK to a video encoder 19. The video decoder 11 is decodes the image data IMG to generate the image block BLK. The enlarged image block generator 12 enlarges the image block BLK. The image extractor 14 extracts a predetermined pixel from the image block BLK. The correction parameter calculator 16 is calculates correction parameters CP(x', y') used in a correction process. The corrector 18 corrects an enlarged image block BLK' using the correction parameters CP(x', y'). The video encoder 19 encodes a corrected image block $BLK_{COR}$ to generate corrected image data IMG'.

First Embodiment

Figure 3:
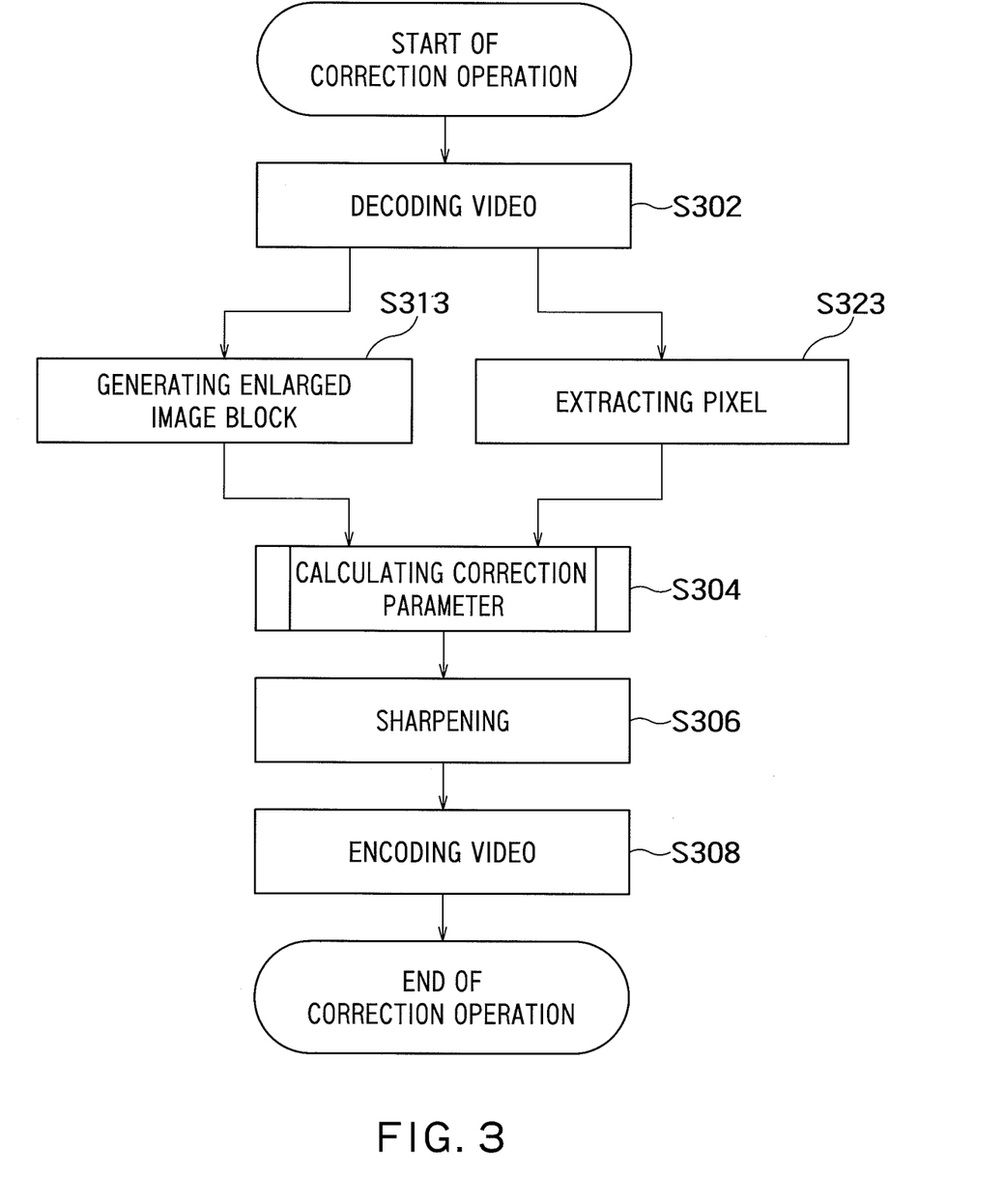
FIG. 3 is a flowchart illustrating the procedure for a correction operation of the first embodiment.

The image processing apparatus 10a of a first embodiment will now be explained. The image processing apparatus 10a of the first embodiment enlarges and sharpens the image data IMG inputted to the image processing system 1. FIG. 3 is a flowchart illustrating the procedure for a correction operation of the first embodiment.

<Decoding Video (S302)>

Figure 4:
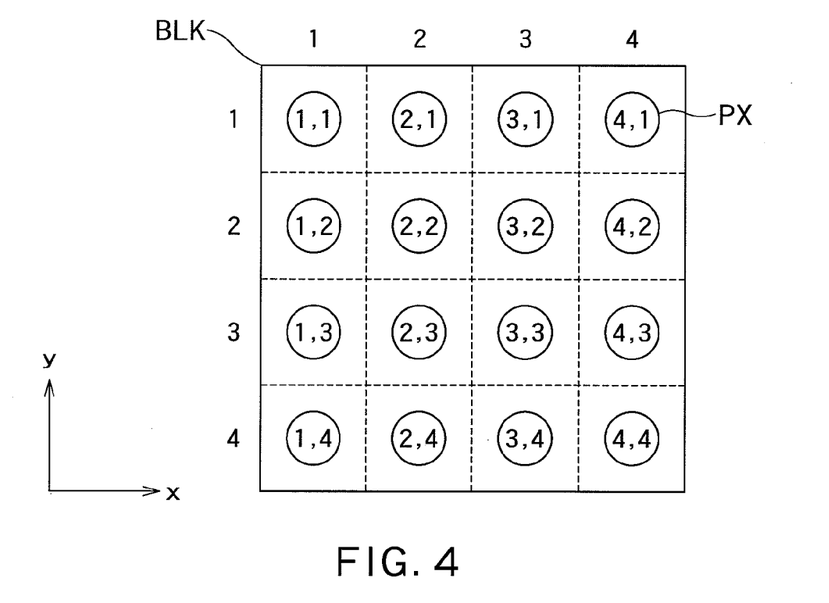
FIG. 4 is a schematic view of the image block BLK of the first embodiment.

The video decoder 11 receives the image data IMG from the memory 20 or the input apparatus (the imaging apparatus 30 or the communicating apparatus 40), and decodes the received image data to generate the image block BLK including a predetermined number of pixels PX(x, y). Symbols (x, y) represent the coordinates of each of pixels PX in the image block BLK. Each pixel PX(x, y) has a predetermined pixel value PV(x, y). FIG. 4 is a schematic view of the image block BLK of the first embodiment. FIG. 4 illustrates the image block BLK including 4×4 (i.e., 16) pixels PX.

<Generating Enlarged Image Block (S313)>

Figure 5:
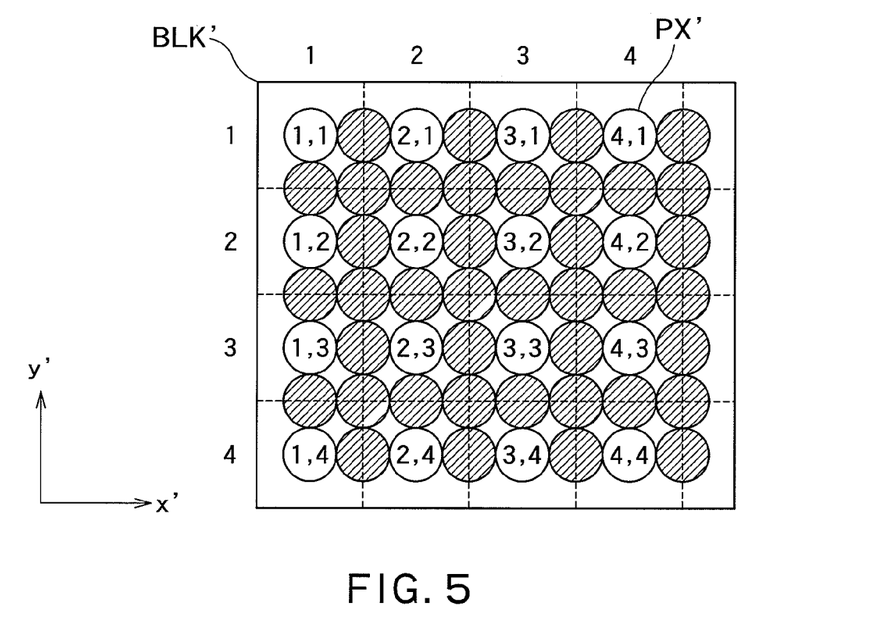
FIG. 5 is a schematic view illustrating an example of an enlarged image block BLK' of the first embodiment.

The enlarged image block generator 12 enlarges the image block BLK by using a predetermined method such as a bilinear method or a bicubic method to generate an enlarged image block BLK' including a predetermined number of enlarged pixels PX'(x', y'). Symbols (x', y') represent the coordinates of each of enlarged pixels PX' in the enlarged image block BLK'. Each enlarged pixel PX'(x', y') has a predetermined pixel value PV'(x', y'). FIG. 5 is a schematic view illustrating an example of an enlarged image block BLK' of the first embodiment. FIG. 5 illustrates the enlarged image block BLK' including 8×8 (i.e., 64) enlarged image pixels PX'. That is, the enlarged image block BLK' of FIG. 5 is generated by enlarging the image block BLK twice.

<Extracing Pixel (S323)>

The pixel extractor 14 extracts a maximum pixel $PX_{MAX}$ having the maximum pixel value a minimum pixel $PX_{MIN}$ having the minimum pixel value from the image block BLK.

<Calculating Correction Parameter (S304)>

Figure 6:
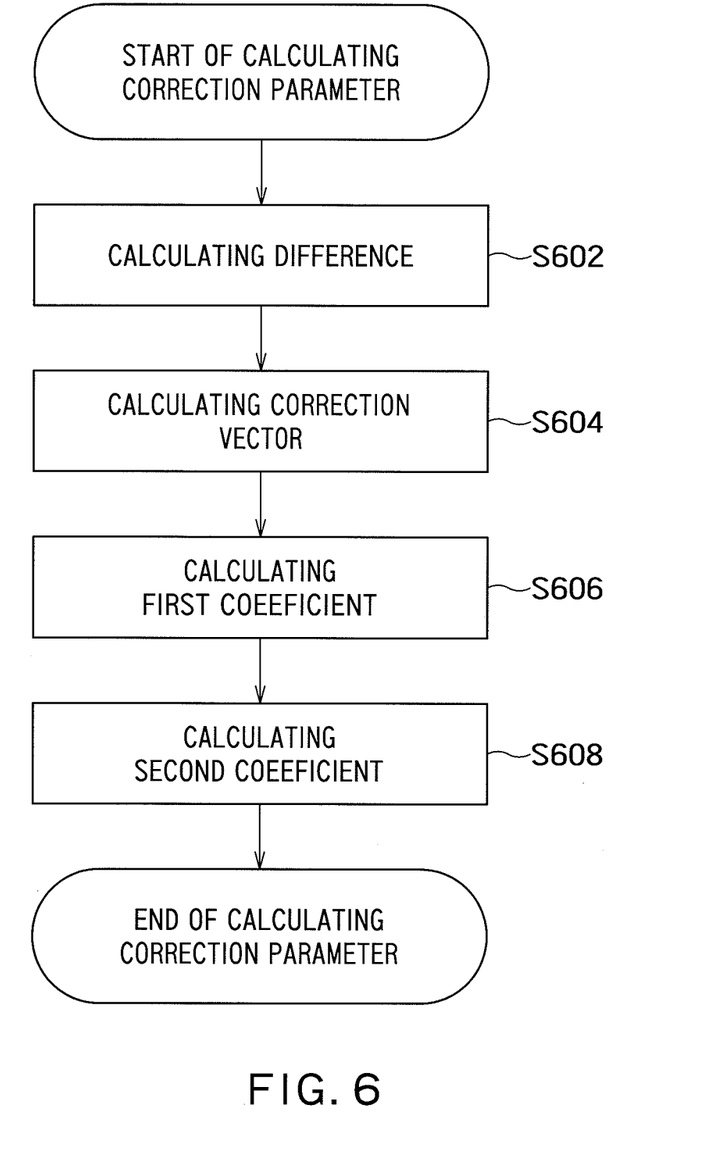
FIG. 6 is a flowchart illustrating the procedure (S304) for calculating correction parameter of the first embodiment.

The correction parameter calculator 16 calculates the correction parameter CP(x', y') including a maximum pixel value $PV_{MAX}$ of the extracted maximum pixel $PX_{MAX}$ and a minimum pixel $PV_{MIN}$ of the extracted minimum pixel $PX_{MIN}$. That is, the correction parameter includes a range of the pixel value PV'(x', y') of an enlarged pixel. The correction parameter CP(x', y') is calculated for each sample pixel $PX'_{SMP}(x', y')$ to be corrected. The correction parameter CP(x', y') is expressed as the product of a correction vector V(x', y'), a first coefficient C1(x', y'), and a second correction coefficient C2(x', y'), as shown in Formula 1. Specifically, S304 is carried out according to the procedure of FIG. 6. FIG. 6 is a flowchart illustrating the procedure (S304) for calculating correction parameter of the first embodiment.

$$CP(x',y')=C1(x',y')\times C2(x',y')\times V(x',y') \quad \text{(Formula 1)}$$

<Calculating Difference (S602)>

The correction parameter calculator 16 calculates a first difference D1(x', y') that is the absolute value of the difference between the sample pixel value $PV'_{SMO}(x', y')$ and the maximum pixel $PX_{MAX}$, and a second difference D2(x', y') that is the absolute value of the difference between the sample pixel value $PV'_{SMP}(x', y')$ and the minimum pixel $PV_{min}$, as shown in Formulas 2 and 3.

$$D1(x',y')=|PV'_{SMP}(x',y')-PV_{MAX}| \quad \text{(Formula 2)}$$

$$D2(x',y')=|PV'_{SMP}(x',y')-PV_{MIN}| \quad \text{(Formula 3)}$$

<Calculating Correction Vector (S604)>

The correction parameter calculator 16 calculates a correction vector V(x', y') based on any difference between the second difference D2(x', y') and the first difference D1(x', y'). The correction vector V(x', y') is a vector function based on any difference between the second difference D2(x', y') and the first difference D1(x', y'). In this vector function, the direction of the correction is defined by the sign of the difference between the second difference D2(x', y') and the first difference D1(x', y') (i.e., by the magnitude relation between the second difference D2(x', y') and the first difference D1(x', y')). The degree of correction is defined by the difference between the second difference D2(x', y') and the first difference D1(x', y'). For example, the correction vector V(x', y') may be a monotone increasing function.

<Calculating First Coefficient (S606)>

The correction parameter calculator 16 calculates the first coefficient C1(x', y') including a third difference D3(x', y') that is the absolute value of the difference between the maximum pixel value $PV_{MAX}$ and the minimum pixel value $PV_{MIN}$. The first coefficient C1(x', y') is a scalar function based on the third difference D3(x', y'). In this scalar function, the degree of correction is defined by the third difference D3(x', y'). For example, the first coefficient C1(x', y') may be a monotone increasing function.

<Calculating Second Coefficient (S608)>

The correction parameter calculator 16 calculates the second coefficient C2(x', y') defined by the degree of characteristic of the image block BLK. The second coefficient C2(x', y') is a scalar function based on the degree of characteristic of the image block BLK. The degree of characteristic of the image block BLK may be detected by the processor 10 that analyzes image data IMG or may be defined by predetermined attribute information (e.g., information indicating a photographic scene when the imaging apparatus 30 captures the image data IMG) included in the image data. For example, the second coefficient C2(x', y') may be a differential coefficient or a constant.

<FIG. 3: Sharpening (S306)>

The corrector 18 adds the correction parameter CP(x', y') to the sample pixel value $PV_{SMP}(x', y')$ to calculate a corrected pixel value $PV_{COR}(x', y')$, as shown in Formula 4. As a result of S306, a corrected image block $BLK_{COR}$ including the corrected pixels $PX_{COR}$ equal in number to the enlarged pixels PX' of the enlarged block BLK' can be obtained.

$$PV_{COR}(x',y')=PV_{SMP}(x',y')+CP(x',y') \quad \text{(Formula 4)}$$

<FIG. 3: Video Encoding (S308)>

The video encoder 19 encodes the corrected image block $BLK_{COR}$ to generate corrected image data IMG' and outputs the generated corrected image data IMG' to the communicating apparatus 40 or the display device 50.

According to the first embodiment, the enlarged pixel value PV'(x', y') in the enlarged image block BLK' is corrected using the maximum pixel value $PV_{MAX}$ and the minimum pixel value $PV_{MIN}$ in the image block BLK. That is, the sharpening operation is performed using only the image data IMG inputted to the image processing system 1. Therefore, the degree and the times required for the sharpening process can be reduced, and also amount of noise in the corrected image block $BLK_{COR}$ can be reduced. Accordingly, an image without distortion can be displayed.

Incidentally, in S306, when the corrected pixel value $PV_{COR}(x', y')$ is greater than the maximum pixel value $PV_{MAX}$, the corrector 18 may change the corrected pixel value $PV_{COR}(x', y')$ to the maximum pixel value $PV_{MAX}$. Conversely, when the corrected pixel value $PV_{COR}(x', y')$ is smaller than the minimum pixel value $PV_{MIN}$, the corrector 18 may change the corrected pixel value $PV_{COR}(x', y')$ into the minimum pixel value $PV_{MIN}$. In other words, in S306, when the corrected image block $BLK_{COR}$ includes a pixel having a pixel value out of a predetermined range, the corrector 18 may change the pixel value out of the predetermined range into the maximum pixel value $PV_{MAX}$ or the minimum pixel value $PV_{MIN}$. Therefore, the corrected pixel value $PV_{COR}(x', y')$ can be fallen within the range from the minimum pixel value $PV_{MIN}$ to the maximum pixel value $PV_{MAX}$. As a result, the excessive enhancement of contrast can be prevented when an image corresponding to the corrected image block $BLK_{COR}$ is displayed.

Second Embodiment

Figure 7:
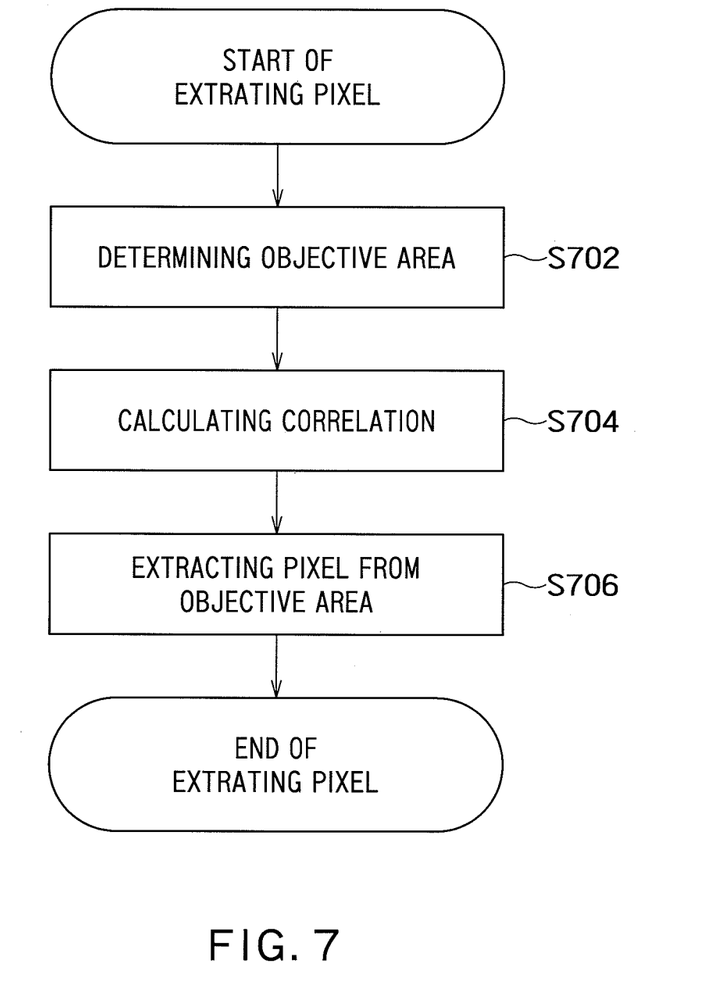
FIG. 7 is a flowchart illustrating the procedure for extracting pixel of the second embodiment.

The image processing apparatus 10a of a second embodiment will now be explained. The image processing apparatus 10a of the second embodiment changes a pixel value of an image block by applying a tap filter to the image block, and then extracts the maximum pixel or the minimum pixel to perform an operation such as a correction process. For example, the tap filter is a 2n−1 (n is an integer of 1 or greater) tap filter such as a 3-tap filter. Descriptions same as those in the first embodiment will not be repeated. FIG. 7 is a flowchart illustrating the procedure for extracting pixel of the second embodiment.

<Determining Objective Area (S702)>

Figure 8:
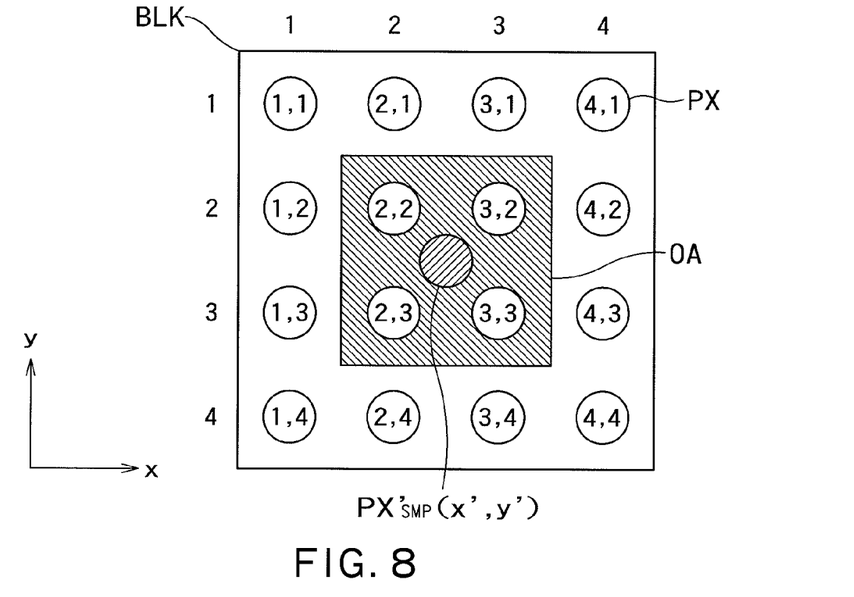
FIG. 8 is a schematic view illustrating an image block BLK including an objective area OA of the second embodiment.

The pixel extractor 14 determines an objective area OA in which the pixel in the image block BLK is extracted. For example, the objective area OA may include 2×2 pixels and be located around the coordinates (x', y') of the sample pixel $PX'_{SMP}$. FIG. 8 is a schematic view illustrating an image block BLK including an objective area OA of the second embodiment. In FIG. 8, the objective area OA includes four pixels, i.e., pixels PX(2, 2) to PX(3, 3).

<Calculating Correlation (S704)>

Figure 9:
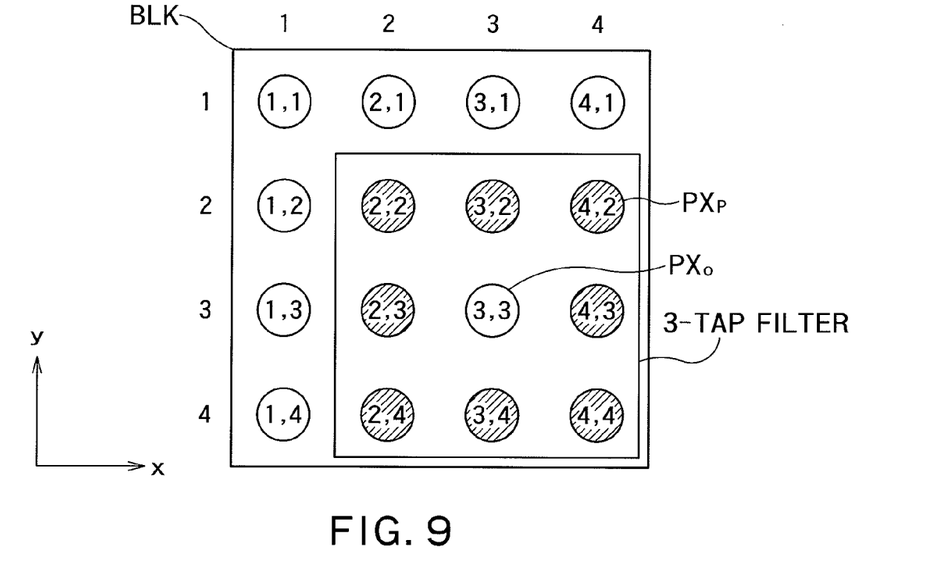
FIG. 9 is a diagram illustrating calculating correlation of the second embodiment.

The pixel extractor 14 applies the tap filter to a objective pixel $PX_O(x, y)$ in the objective area OA to calculate a correlation value $\rho(x, y)$ of the objective pixel $PX_O(x, y)$ with the surrounding pixel $PX_P(xp, yp)$ that is surrounded by the objective pixel $PX_O(x, y)$, and changes the objective pixel value $PX_O(x, y)$ into the correlation value $\rho(x, y)$. Therefore, the objective pixel value $PX_O$ is corrected to a value correlated with the surrounding pixel values $PV_P(xp, yp)$. FIG. 9 is a diagram illustrating calculating correlation of the second embodiment. As shown in FIG. 9, when the 3-tap filter is applied to the objective pixel $PX_O(3, 3)$, the pixel value of the objective pixel $PX_O(3, 3)$ is changed into the correlation value $\rho(3, 3)$ of nine (3×3) pixels (i.e., the objective pixel $PX_O(3, 3)$ and eight surrounding pixels $PX_P(2, 2)$ to $PX_P(4, 4)$) whose center pixel is the objective pixel $PX_O(3, 3)$. S704 is executed for all the objective pixels $PX_O$ in the objective area OA.

<Extracting Pixel from Objective Area (S706)>

The pixel extractor 14 extracts the maximum pixel $PX_{MAX}$ and the minimum pixel $PX_{MIN}$ from the objective area OA. When S706 is completed, S304 to S308 are carried out as in the first embodiment.

According to the second embodiment, the objective pixel value $PX_O(x, y)$ is changed applying the tap filter to the image block, and then the maximum pixel $PX_{MAX}$ and the minimum pixels $PX_{MIN}$ are extracted from the objective area OA. Therefore, using one type of process, the maximum pixel $PX_{MAX}$ and minimum pixel $PX_{MIN}$ correlated with their surrounding pixels can be extracted irrespective of characteristics of the image. Compared to the first embodiment, noise in the corrected image block $BLK_{COR}$ can be further reduced. Accordingly, an image without distortion can be displayed.

Third Embodiment

Figure 10:
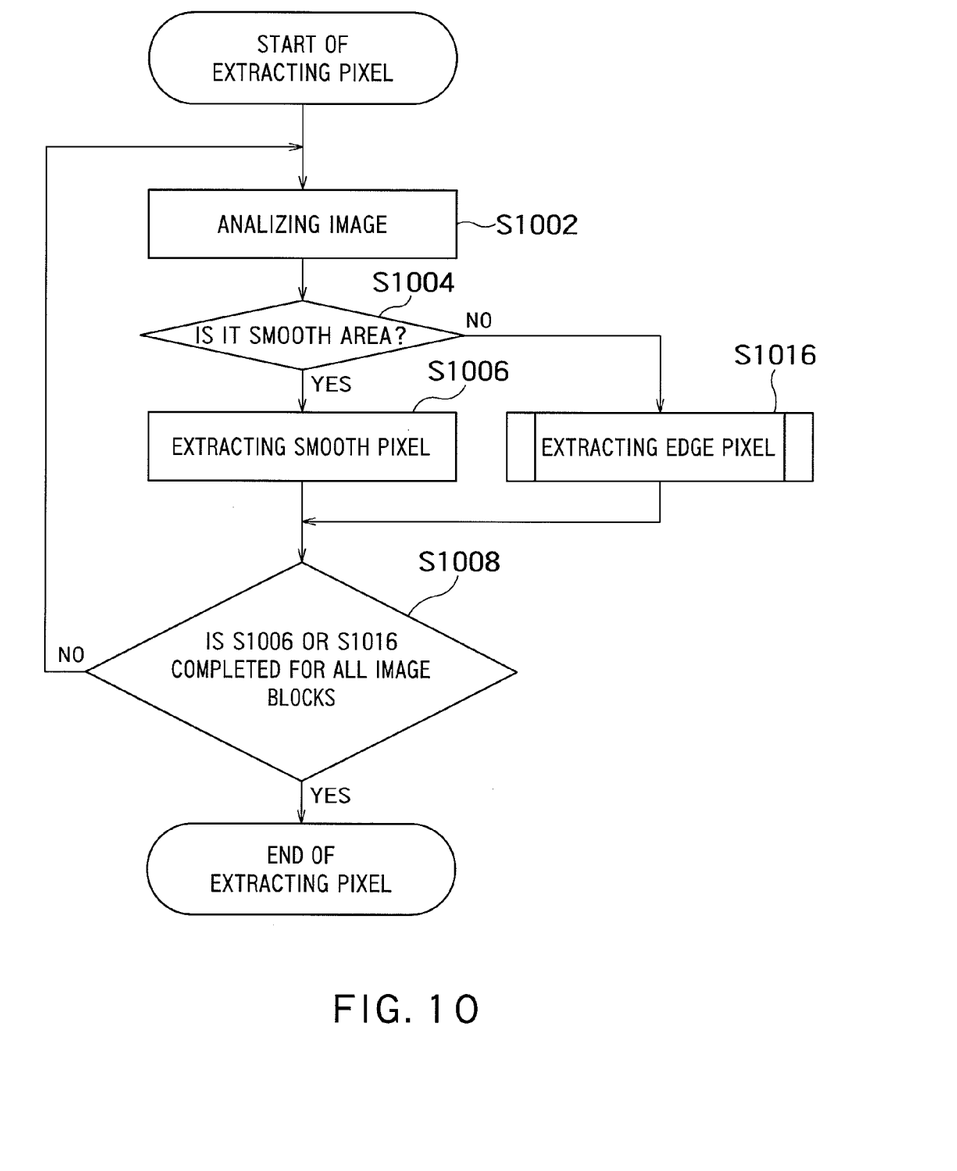
FIG. 10 is a flowchart illustrating the procedure for extracting pixel of the third embodiment.

The image processing apparatus 10 of a third embodiment will now be explained. The image processing apparatus 10a of the third embodiment uses algorithm for an edge area and other algorithm for a smooth area when maximum and minimum pixels are extracted from the edge and smooth areas to correct image data. Descriptions identical to those in the embodiments described above will not be repeated. FIG. 10 is a flowchart illustrating the procedure for extracting pixel of the third embodiment.

<Analyzing Image (S1002)>

Figure 11:
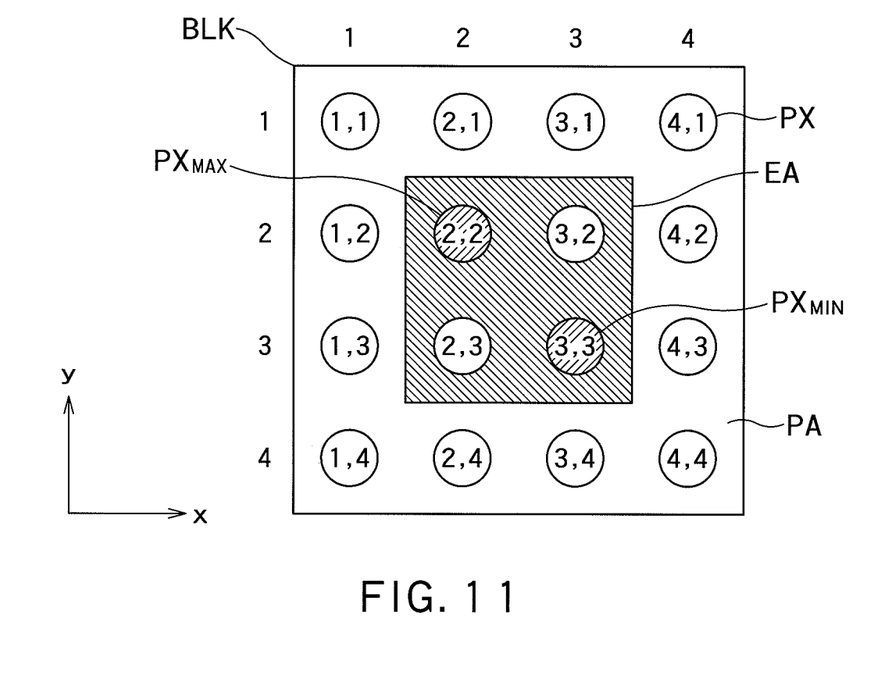
FIG. 11 is a schematic view of the image block BLK divided into the edge area EA and the smooth area SA in the third embodiment.

The pixel extractor 14 divides the image block BLK into an edge area EA and a smooth area SA based on the degree of characteristic of the image block BLK. Specifically, the pixel extractor 14 analyzes the characteristic of the image block BLK to detect the degree of characteristic of the image block BLK. Based on the detected degree of characteristic, the pixel extractor 14 detects the edge portion or the outline portion of the image block BLK. The image extractor 14 then defines the area (i.e., the area where the edge portion or the outline portion is detected) as the edge area EA, and the area other than the edge area (i.e., the area where neither the edge portion nor the outline portion is detected) as the smooth area SA. The image extractor 14 divides the image block BLK based on the edge area EA and the smooth area SA. FIG. 11 is a schematic view of the image block BLK divided into the edge area EA and the smooth area SA in the third embodiment. In FIG. 11, the area that includes pixels PX(2, 2) to PX(3, 3) is the edge area EA and the area that not including the pixels PX(2, 2) to PX(3, 3) is the smooth area SA.

The method for detecting the degree of characteristic of the image block BLK is an edge detecting method or an outline detecting method. In the edge detecting method, an edge portion with a luminance gradient greater than a predetermined threshold is detected using a Sobel filter or a Laplacian filter. In the outline detecting method, an outline portion with an image of the frequency characteristic correlated with the surrounding portions of the image among a plurality of edge portions is detected. It should be noted that the method for detecting the degree of characteristic of the image block BLK is limited to neither the edge detecting method nor the outline detecting method.

<S1004>

The pixel extractor 14 determines whether the result of the analysis in S1002 is the smooth area SA or not. When the result is the smooth area SA (S1004—YES), S1006 is carried out. When the result is the edge area EA (S1004—NO), S1016 is carried out.

<Extracting Smooth Pixel (S1006)>

The pixel extractor 14 extracts a first maximum pixel $PX1_{MAX}$ having the maximum pixel value and a first minimum pixel $PX1_{MIN}$ having the minimum pixel value from the smooth area SA, as in extracting pixel (FIG. 3) of the first embodiment or as in extracting pixel (FIG. 7) of the second embodiment.

<Extracting Edge Pixels (S1016)>

Figure 12:
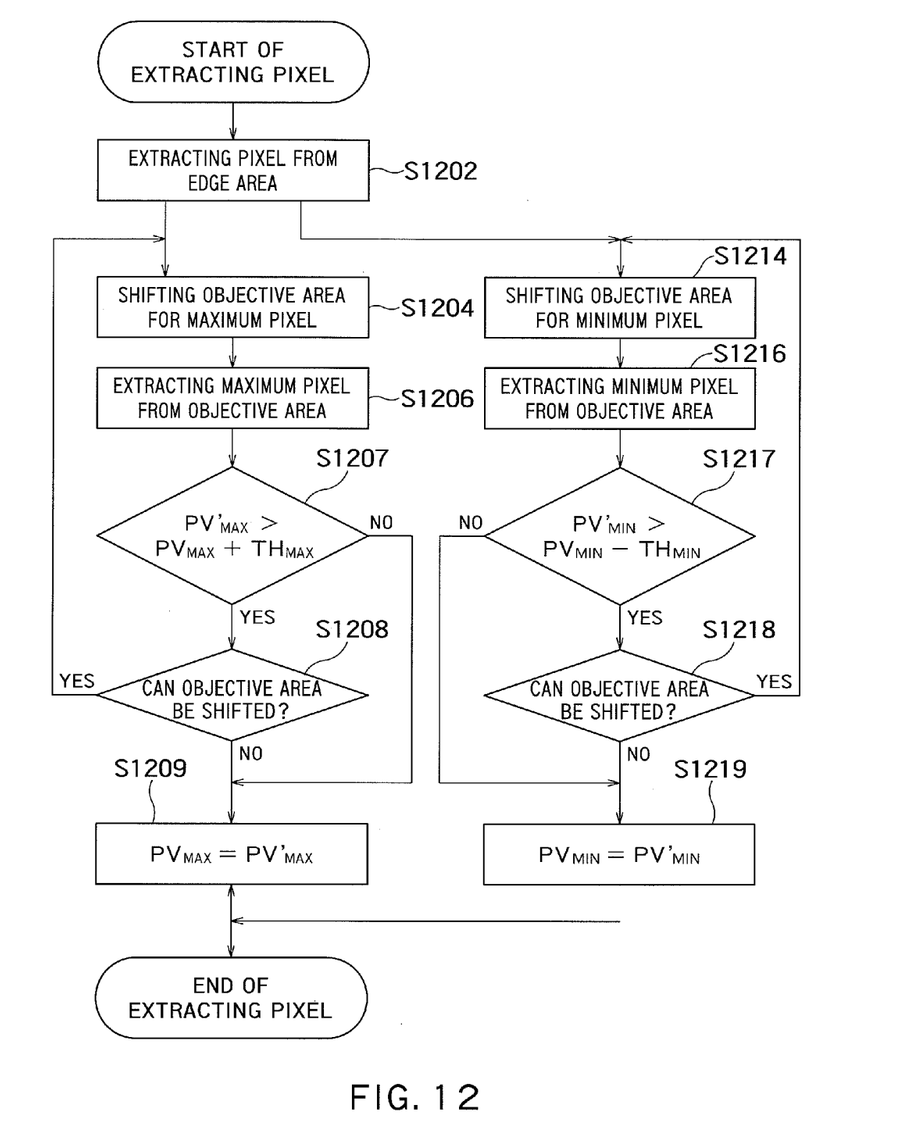
FIG. 12 is a flowchart illustrating the procedure for extracting pixel of the third embodiment.

The pixel extractor 14 extracts a second maximum pixel $PX2_{MAX}$ having the maximum pixel value and a second minimum pixel $PX2_{MIN}$ having the minimum pixel value from the edge area EA. S1016 is carried out according to the procedure of FIG. 12. FIG. 12 is a flowchart illustrating the procedure for extracting pixel of the third embodiment.

<Extracting Pixel from Edge Area (S1202)>

The pixel extractor 14 extracts the maximum pixel $PX_{MAX}$ and the minimum pixel $PX_{MIN}$ from the edge area EA. For example, in FIG. 11, the pixel PX(2, 2) is extracted as the maximum pixel $PX_{MAX}$ and the pixel PX(3, 3) is extracted as the minimum pixel $PX_{MIN}$. When S1202 is completed, the maximum pixel $PX_{MAX}$ and the minimum pixel $PX_{MIN}$ are respectively processed.

<Shifting Objective Area for Maximum Pixel (S1204) and Extracting Maximum Pixel from Objective Area (S1206)>

The pixel extractor 14 shifts the objective area in the direction connecting the extracted minimum pixel $PX_{MIN}$ and maximum pixel $PX_{MAX}$ (i.e., the direction from the minimum pixel $PX_{MIN}$ to the maximum pixel $PX_{MAX}$) (S1204). The shifted objective area includes the maximum pixel $PX_{MAX}$. Subsequently, from the shifted objective area, the pixel extractor 14 extracts the maximum pixel $PX'_{MAX}$ among the pixels except for the maximum pixel $PX_{MAX}$ in the pre-shifted objective area (S1206).

<S1207 and S1208>

The pixel extractor 14 determines whether the maximum pixel $PX'_{MAX}$ in the shifted objective area is greater than a maximum reference value that is the sum of the maximum pixel value $PV_{MAX}$ in the edge area EA and a predetermined maximum pixel threshold $TH_{MAX}$ (S1207). When the maximum pixel value $PV_{MAX}$ is greater than the maximum reference value (S1207—YES), the pixel extractor 14 determines whether the objective area can be shifted or not (S1208). For example, when the shifted objective area includes a pixel at the edge of the image block BLK or when the number of times that shifting is carried out reaches a predetermined number, it is determined that the objective area cannot be shifted (S1208—NO), and then the flow proceeds to S1209. When it is determined that the objective area can be shifted (S1208—YES), the flow returns to S1204. On the other hand, when the maximum pixel value $PV'_{MAX}$ is equal to or smaller than the maximum reference value (S1207—NO), the flow proceeds to S1209.

<S1209>

The pixel extractor 14 defines the maximum pixel $PX'_{MAX}$ extracted from the shifted objective area as the maximum $PX_{MAX}$. When the maximum pixel value $PV'_{MAX}$ is equal to or smaller than the maximum reference value (S1207—NO), the maximum pixel $PX_{MAX}$ is defined as the maximum pixel for the whole of the image block BLK.

<Shifting Objective Area for Minimum Pixel (S1214) and Extracting Minimum Pixel from Objective Area (S1216)>

The pixel extractor 14 shifts the objective area in the direction connecting the extracted maximum pixel $PX_{MAX}$ and the minimum pixel $PX_{MIN}$ (i.e., the direction from the maximum pixel $PX_{MAX}$ to the minimum pixel $PX_{MIN}$) (S1214). The shifted objective area includes the minimum pixel $PX_{MIN}$. Subsequently, in the shifted objective area, the pixel extractor 14 extracts the minimum pixel $PX_{MIN}$ among the pixels except for the minimum pixel $PX_{MIN}$ in the pre-shifted objective area (S1216).

<S1217 and S1218>

The pixel extractor 14 determines whether the minimum pixel $PX_{MIN}$ in the shifted objective area is smaller than a minimum reference value that is the difference between the minimum pixel $PX_{MIN}$ in the edge area EA and a predetermined minimum pixel threshold $TH_{MIN}$ (S1217). When the minimum pixel value $PV'_{MIN}$ is smaller than the minimum reference value (S1217—YES), the pixel extractor 14 determines whether the objective area can be shifted or not (S1218). For example, when the shifted objective area includes a pixel at the edge of the image block BLK or when the number of times that shifting is carried out reaches a predetermined number, it is determined that the objective area cannot be shifted (S1218—NO), and then the flow proceeds to S1219. When it is determined that the objective area can be shifted (S1218—YES), the flow returns to S1214. On the other hand, when the minimum pixel value $PV'_{MIN}$ is equal to or greater than the minimum reference value (S1217—NO), the flow proceeds to S1219.

<S1219>

The pixel extractor 14 defines the minimum pixel $PX'_{MIX}$ extracted from the shifted objective area as the minimum $PX_{MIX}$. When the minimum pixel value $PV'_{MIN}$ is equal to or smaller than the minimum reference value (S1217—NO), the minimum pixel $PX_{MIX}$ is defined as the minimum pixel for the whole of the image block BLK.

<S1008>

The pixel extractor 14 determines whether S1006 or S1016 is completed for all the image blocks BLK (S1008). When it is not completed (S1008—NO), the flow returns to S1002. When it is completed (S1008—YES), extracting pixel is completed. When extracting pixel is completed, S304 to S308 are carried out as in the first embodiment.

Figure 13:
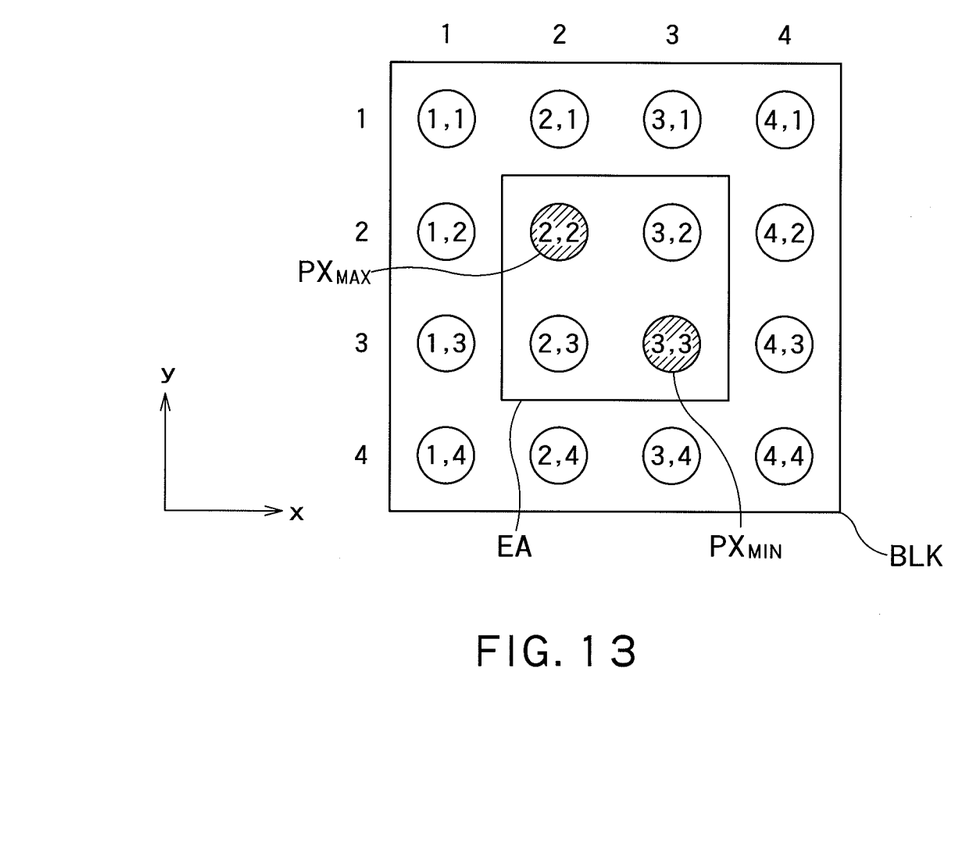
FIGS. 13 to 15 are diagrams for extracting edge pixel of the third embodiment.
Figure 14:
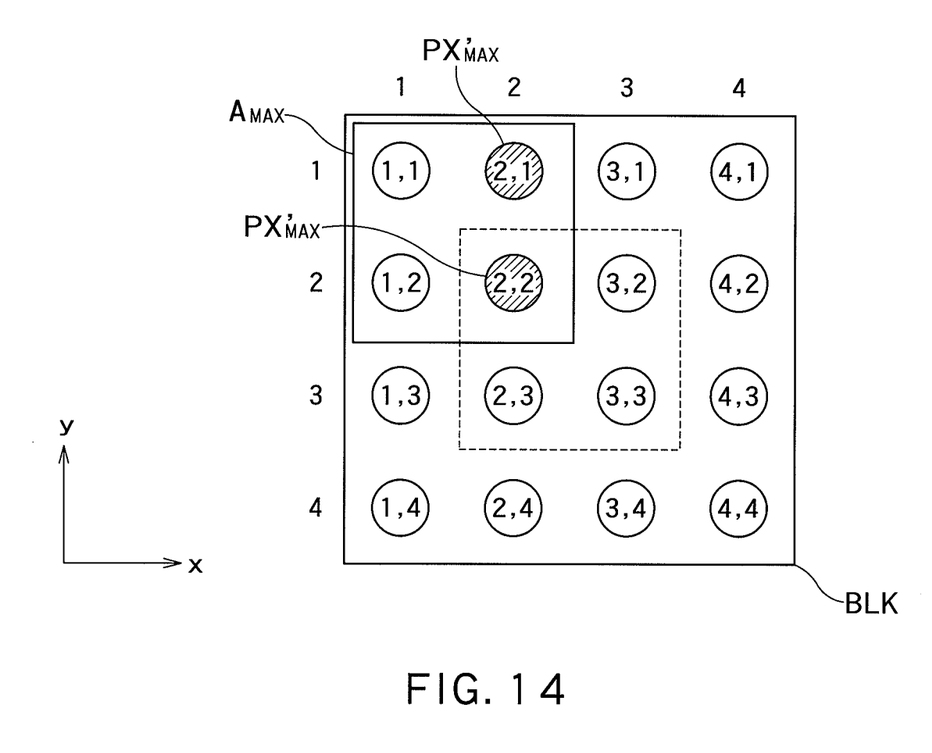
Figure 15:
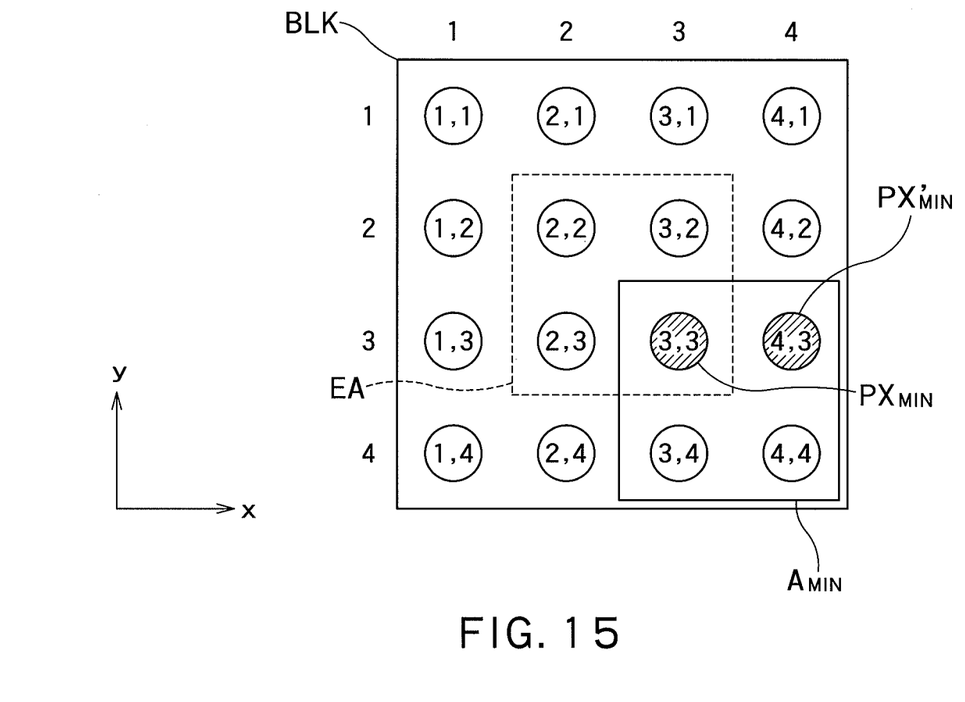

FIGS. 13 to 15 are diagrams for extracting edge pixel of the third embodiment. As shown in FIG. 13, the maximum pixel $PX_{MAX}(2, 2)$ and the minimum pixel $PX_{MIN}(3, 3)$ are extracted from the edge area EA in S1202. Extracting the maximum pixel and the minimum pixel for all the images BLK will now be explained.

As shown in FIG. 14, the objective area is shifted in the direction connecting the minimum pixel $PX_{MIN}(3, 3)$ and the maximum pixel $PX_{MAX}(2, 2)$, that is, the direction from the edge area EA to the area $A_{MAX}$, in S1204. Subsequently, the maximum pixel $PX'_{MAX}(2, 1)$ is extracted from the area $A_{MAX}$ in S1206. Then, it is determined whether the maximum pixel $PX'_{MAX}(2, 1)$ is greater than the maximum reference value or not in S1207. When the maximum pixel $PX'_{MAX}(2, 1)$ is greater than the maximum reference value, it is determined whether the objective area can be shifted or not in S1208. In FIG. 14, since the area $A_{MAX}$ includes pixels PX(1, 1), PX(1, 2), and PX(2, 1) at the edges of the image block BLK, the objective area cannot be shifted from the area $A_{MAX}$ to another area. Therefore, the maximum pixel $PX'_{MAX}(2, 1)$ is set as the maximum pixel $PX_{MAX}$ for the image block BLK in S1209.

As shown in FIG. 15, the objective area is shifted in the direction connecting the maximum pixel $PX_{MAX}(2, 2)$ and the minimum pixel $PX_{MIN}(3, 3)$, that is, from the edge area EA to the area $A_{MIN}$, in S1214. Subsequently, the minimum pixel $PX'_{MIN}(4, 3)$ is extracted from the area $A_{MIN}$ in S1216. Next, it is determined whether the minimum pixel $PX'_{MIN}(4, 3)$ is smaller than the minimum reference value or not in S1217. When the minimum pixel $PX'_{MIN}(4, 3)$ is smaller than the minimum reference value, it is determined whether the objective area can be shifted or not in S1218. In FIG. 15, since the area $A_{MIN}$ includes pixels PX(4, 3), PX(3, 4), and PX(4, 4) at the edges of the image block BLK, the objective area cannot be shifted from the area $A_{MIN}$ to another area. Therefore, the minimum pixel $PX'_{MIN}(4, 3)$ is set as the minimum pixel $PX_{MIN}$ for the image block BLK in S1219.

According to the third embodiment, when at least one of the second maximum pixel value $PV2_{MAX}$ and the second minimum pixel value $PV2_{MIN}$ is not included in a predetermined range, at least one of the second maximum pixel value $PV2_{MAX}$ and the second minimum pixel value $PV2_{MIN}$ is extracted from the objective area obtained by shifting the area including at least one of the second maximum pixel value $PV2_{MAX}$ and the second minimum pixel value $PV2_{MIN}$ in a predetermined direction. In the third embodiment, a pixel with a pixel value closer to the maximum pixel value $PV_{MAX}$ is corrected in the direction of the maximum pixel $PX_{MAX}$, and a pixel with a pixel value closer to the minimum pixel $PV_{MIN}$ is corrected in the direction of the minimum pixel $PX_{MIN}$. On the other hand, a pixel with a pixel value close to the median between the maximum pixel value $PV_{MAX}$ and the minimum pixel value $PV_{MIN}$ is not corrected. Compared to the first and second embodiments, noise in the corrected image block $BLK_{COR}$ can be further reduced. Accordingly, the image without distortion can be displayed.

Furthermore, according to the third embodiment, the image date is corrected in the smooth area and the edge area separately from each other. Hence, pixels can be corrected using parameters differing according to areas. Compared to the first and second embodiments, quality of the image represented by the corrected image data IMG' can be improved.

At least a portion of the image processing apparatus $10a$ according to the above-described embodiments may be composed of hardware or software. When at least a portion of the image processing apparatus $10a$ is composed of software, a program for executing at least some functions of the image processing apparatus $10a$ may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing apparatus $10a$ according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing apparatus comprising:
an image block generator configured to enlarge an image block comprising a plurality of pixels to generate an enlarged image block;
a pixel extractor configured to extract a maximum pixel with a maximum pixel value and a minimum pixel with a minimum pixel value from the image block;
a correction parameter calculator configured to calculate a correction parameter comprising a first difference, a second difference, and a vector function, the first difference being an absolute value of a difference between a sample pixel value of a sample pixel to be corrected in the enlarged image block and the maximum pixel value, the second difference being an absolute value of a difference between the sample pixel value and the minimum pixel value, the vector function comprising a direction and degree, the direction defined by magnitude relation between the first difference and the second difference, the degree defined by an absolute value of a difference between the first difference and the second difference, the correction parameter comprising a product of a first coefficient and the vector function, the first coefficient defined by an absolute value of a difference between the maximum pixel value and the minimum pixel value; and
a corrector configured to add the correction parameter to the sample pixel value to correct the enlarged image block.

2. The apparatus of claim 1, wherein the pixel extractor determines an objective area comprising an objective pixel to be extracted in the image block, changes a pixel value of the objective pixel by a tap filter, and extract the maximum pixel and the minimum pixel from the objective area.

3. The apparatus of claim 1, wherein the pixel extractor divides the image block into an edge area and a smooth area based on degree of characteristic of the image block, extracts a first maximum pixel comprising the maximum pixel value and a first minimum pixel comprising the minimum pixel value in the edge area, and extracts a second maximum pixel comprising the maximum pixel value and a second minimum pixel comprising the minimum pixel value in the smooth area.

4. The apparatus of claim 3, wherein when at least one of a pixel value of the second maximum pixel and a pixel value of the second minimum pixel is out of a predetermined range, the pixel extractor extracts at least one of the second maximum pixel and the second minimum pixel from the objective area to which an area comprising at least one of the second maximum pixel and the second minimum pixel is, at least one of the extracted second maximum pixel and the extracted second minimum pixel with pixel values in the predetermined range.

5. The apparatus of claim 1, wherein the vector function is a monotone increasing function.

6. The apparatus of claim 1, wherein the first coefficient is a monotone increasing function.

7. The apparatus of claim 1, wherein the correction parameter calculator calculates the correction parameter comprising a product of the first coefficient, a second coefficient and the vector function, the second coefficient defined by degree of characteristic of the image block.

8. The apparatus of claim 7, wherein the correction parameter calculator determines the second coefficient based on attribute information included in the image block.

9. The apparatus of claim 7, wherein the correction parameter calculator analyze the image block to detect the degree and determines the second coefficient based on the detected degree.

10. The apparatus of claim 1, wherein when the corrected enlarged image block comprises a pixel with a corrected pixel value out of a predetermined range, the corrector changes the corrected pixel value into at least one of the maximum pixel value and the minimum pixel value.

11. An image processing system comprising:
an image block generator configured to enlarge an image block comprising a plurality of pixels to generate an enlarged image block;
a pixel extractor configured to extract a maximum pixel with a maximum pixel value and a minimum pixel with a minimum pixel value from the image block;
a correction parameter calculator configured to calculate a correction parameter comprising a first difference, a second difference, and a vector function, the first difference being an absolute value of a difference between a sample pixel value of a sample pixel to be corrected in the enlarged image block and the maximum pixel value, the second difference being an absolute value of a difference between the sample pixel value and the minimum pixel value, the vector function comprising a direction and degree, the direction defined by magnitude relation between the first difference and the second difference, the degree defined by an absolute value of a difference between the first difference and the second difference, the correction parameter comprising a product of a first coefficient and the vector function, the first coefficient defined by an absolute value of a difference between the maximum pixel value and the minimum pixel value; and a corrector configured to add the correction parameter to the sample pixel value to correct the enlarged image block; and a display configured to display an image based on the corrected enlarged image block.

12. The system of claim 11, further comprising:

an imaging apparatus configured to pick up the image of an object to generate image data comprising a plurality of pixels; and a video decoder configured to decode the image data to generate the image block.

13. The system of claim 11, further comprising:

a memory configured to store image data; and a video decoder configured to decode the image data to generate the image block.

14. The system of claim 11, further comprising:

a communicator apparatus configured to receive image data via a network; and a video decoder configured to decode the image data to generate the image block.

15. The system of claim 11, wherein the pixel extractor determines an objective area comprising an objective pixel to be extracted in the image block, applies a tap filter to the objective area to change a pixel value of the objective pixel, and extract the maximum pixel and the minimum pixel from the objective area.

16. The system of claim 11, wherein the pixel extractor divides the image block into an edge area and a smooth area based on degree of characteristic of the image block, extracts a first maximum pixel comprising the maximum pixel and a first minimum pixel comprising the minimum pixel in the edge area, and extracts a second maximum pixel comprising the maximum pixel and a second minimum pixel comprising the minimum pixel in the smooth area.

17. The system of claim 16, wherein when at least one of the pixel extractor extracts a pixel value of the second maximum pixel and a pixel value of the second minimum pixel is out of a predetermined range, the pixel extractor extracts at least one of the second maximum pixel and the second minimum pixel from the objective area to which an area comprising at least one of the second maximum pixel and the second minimum pixel is, at least one of the extracted second maximum pixel and the extracted second minimum pixel with pixel values in the range.

18. A method for processing image, the method comprising:

enlarging an image block comprising a plurality of pixels to generate an enlarged image block;

extracting a maximum pixel with a maximum pixel value and a minimum pixel with a minimum pixel value from the image block;

calculating a a correction parameter comprising a first difference, a second difference, and a vector function, the first difference being an absolute value of a difference between a sample pixel value of a sample pixel to be corrected in the enlarged image block and the maximum pixel value, the second difference being an absolute value of a difference between the sample pixel value and the minimum pixel value, the vector function comprising a direction and degree, the direction defined by magnitude relation between the first difference and the second difference, the degree defined by an absolute value of a difference between the first difference and the second difference, the correction parameter comprising a product of a first coefficient and the vector function, the first coefficient defined by an absolute value of a difference between the maximum pixel value and the minimum pixel value; and adding the correction parameter to the sample pixel value to correct the enlarged image block.

* * * * *